US010064386B2

(12) United States Patent
Winn

(10) Patent No.: US 10,064,386 B2
(45) Date of Patent: Sep. 4, 2018

(54) FEEDER CHUTE WITH MUZZLE-ACTIVATED SELECTIVE ACCESS

(71) Applicant: Shane Winn, Woodward, OK (US)

(72) Inventor: Shane Winn, Woodward, OK (US)

( * ) Notice: Subject to any disclaimer, the term of this patent is extended or adjusted under 35 U.S.C. 154(b) by 129 days.

(21) Appl. No.: 15/270,224

(22) Filed: Sep. 20, 2016

(65) Prior Publication Data

US 2018/0077898 A1 Mar. 22, 2018

(51) Int. Cl.
*A01K 5/00* (2006.01)
*A01K 5/02* (2006.01)

(52) U.S. Cl.
CPC .................................... *A01K 5/025* (2013.01)

(58) Field of Classification Search
CPC .............................. A01K 5/025; A01K 5/0233
USPC ..................... 119/57.91, 52.4, 53.5, 54, 52.3
See application file for complete search history.

(56) References Cited

U.S. PATENT DOCUMENTS 1,354,802 A 10/1920 Castner, Jr.
1,437,462 A 12/1922 Belvel
1,449,818 A 3/1923 Harvey
1,595,758 A * 8/1926 Collins .................. A01K 5/025 119/54
1,701,338 A 2/1929 Rowles
1,810,782 A 6/1931 Morris
2,234,112 A * 3/1941 Emrick .................. A01K 5/025 119/53.5
2,842,096 A 7/1958 Bradfield
3,019,766 A 2/1962 Pannier
3,139,861 A * 7/1964 Oliver .................... A01K 5/025 119/53
D245,714 S 9/1977 Becker
4,246,678 A 1/1981 Cunningham
4,351,274 A 9/1982 Pannier
5,351,649 A * 10/1994 Rovira Badia ...... A01K 5/0225 119/53.5
5,649,499 A * 7/1997 Krietzman ........... A01K 5/0114 119/52.1
5,852,987 A * 12/1998 Lamp, Jr. ............. A01K 5/0142 119/62
7,302,912 B2 * 12/2007 Boyer .................. A01K 5/0225 119/51.01

(Continued)

FOREIGN PATENT DOCUMENTS

BE 877473 A * 3/1979 ............... A01K 5/02

OTHER PUBLICATIONS

Steel Outdoors; "Varmit Proof Steel Deer Feeder 400lb 4 Spout Gravity Fed", retrieved on Mar. 20, 2017 from http://www.steeloutdoors.com/products-detail/400-gravity-feeder.

(Continued)

*Primary Examiner* — Son T Nguyen
(74) *Attorney, Agent, or Firm* — Robert H. Frantz

(57) ABSTRACT

A feed chute for dispensing to a first kind of animal but rejecting a larger muzzle and tongue of a second kind of animal. A gate is hinged to a first shorter side wall such that the gate forms one side of a dispenser end of the chute when the gate is fully-open, sufficiently large to accommodate a muzzle of the first kind of animal. The gate detente determines a closed position of the dispenser end. When the second kind of animal attempts to access the feed, its wider muzzle urges the gate towards the fully-closed position, which is sufficiently small to prevent entry of the second kind's muzzle and tongue.

4 Claims, 4 Drawing Sheets

100 109 101 103a 103b 110 108 104 106 105 107 102 111

(56) References Cited

U.S. PATENT DOCUMENTS

| | | | | |
|---|---|---|---|---|
| 7,735,454 | B1 * | 6/2010 | Stoppelberg ......... | A01K 5/0225 119/52.4 |
| 7,891,317 | B2 | 2/2011 | Bodenstab et al. | |
| 7,975,648 | B2 | 7/2011 | Kleinsasser | |
| 8,939,109 | B2 | 1/2015 | Kleinsasser | |
| 9,480,239 | B2 * | 11/2016 | Worsley ................... | A01K 5/01 |
| 2007/0051317 | A1 * | 3/2007 | Bruner ................. | A01K 1/0107 119/53 |
| 2015/0181801 | A1 * | 7/2015 | Niemela .............. | A01C 17/001 119/51.01 |

OTHER PUBLICATIONS

Texas Wildlife Supply; "Protein Deer Feeders for Sale"; retrieved on Mar. 20, 2017 from http://www.texaswildlifesupply.com/protein-feeders.html.

Priefert; "Automatic Deer Feeder ADF1000"; retrieved on Jul. 17, 2016 from http://www.deerchute.com.

Oklahoma Shooters Association; "Keeping Cattle out of Feeders" discussion thread, retrieved on Jul. 17, 2016 from http://www.texaswildlifesupply.com/protein-feeders.html.

The High Road; "Best deer feeder type w/Hogs & cattle present???" retrieved on Jul. 17, 2016 from http://www.thehighroad.org/archive/index.php/t-468449.html.

Boss Buck; "Poly Gravity Feeder Lower Unit"; retrieved on Jul. 17, 2016 from https://www.bossbuck.com/products/lowerunits/3polyunit.html.

Boss Buck; Square Varmint Cage; retrieved on Jul. 17, 2016 from https://www.bossbuck.com/products/parts/squarecage.html.

* cited by examiner

FEEDER CHUTE WITH MUZZLE-ACTIVATED SELECTIVE ACCESS

BACKGROUND

Animal feeders on farms, ranches, in zoos, and in the wilderness are susceptible to food theft by undesired animals for which the feed is not intended. For example, a deer feeder is often set up and loaded with feed such as pellets or corn, and then left in a hunting area for the indigenous deer to find. However, other large animals such as cattle, and varmints such as racoons and squirrels, may also steal the feed because the feeder device has no way of dispensing the feed only to the intended animal (deer).

SUMMARY OF THE DISCLOSED EMBODIMENT(S) OF THE INVENTION

A feed chute for dispensing to a first kind of animal but rejecting a larger muzzle and tongue of a second kind of animal. A gate is hinged to a first shorter side wall such that the gate forms one side of a dispenser end of the chute when the gate is fully-open, sufficiently large to accommodate a muzzle of the first kind of animal. The gate detente determines a closed position of the dispenser end. When the second kind of animal attempts to access the feed, its wider muzzle urges the gate towards the fully-closed position, which is sufficiently small to prevent entry of the second kind's muzzle and tongue.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Problems Recognized

The present inventor has recognized a problem with various feeder chutes in the available art which have not been recognized by others so far. Consider, for example, deer feeders which are loaded and left in woods, forests, pastures, etc., to attract and feed deer. Many of them have chutes which provide a fixed opening size that is smaller than the muzzle width of local cattle in an attempt to keep the cattle from stealing and consuming the feed. However, for some reason, the cattle continue to access the feed, as do other varmints. For the purposes of this disclosure, we will refer to two different kinds of animals, cattle and deer, and those skilled in the art will readily recognize that other kinds of animals having certain physiological differences in their snout or muzzle structures and their tongues may be equally well served by embodiments of the present invention.

The present inventor has discovered that this is because present-day feeder chutes only reject animals based on a fixed or static muzzle width, but there is also a physiological difference between deer and cattle in how their tongues move and extend. For example, a deer's tongue does not extend as far as a cow's tongue, and it does not roll up like a cow's. So, a deer must take feed from a chute which has a horizontal floor in it by rotating its head slightly.

Thus, in order for a deer to readily feed from a chute, the opening must be somewhat wider than the actual width of the deer's muzzle. This opening, however, can be smaller than the width of a cow's muzzle in the chutes of the present art, but the cow can still steal feed by extending and/or rolling its tongue up and into the chute. Then, the cow essentially licks the feed from the chute, thereby defeating the structure's attempt to selectively dispense feed only to the deer.

Having discovered this second (additional) physiological difference between deer and cattle, the present inventor has set about designing and experimenting with various chute designs which would be more effective in dispensing feed only to the smaller muzzle animal, such as a deer, and effectively blocking access to a larger muzzle animal, such as a cow.

Figure 1:
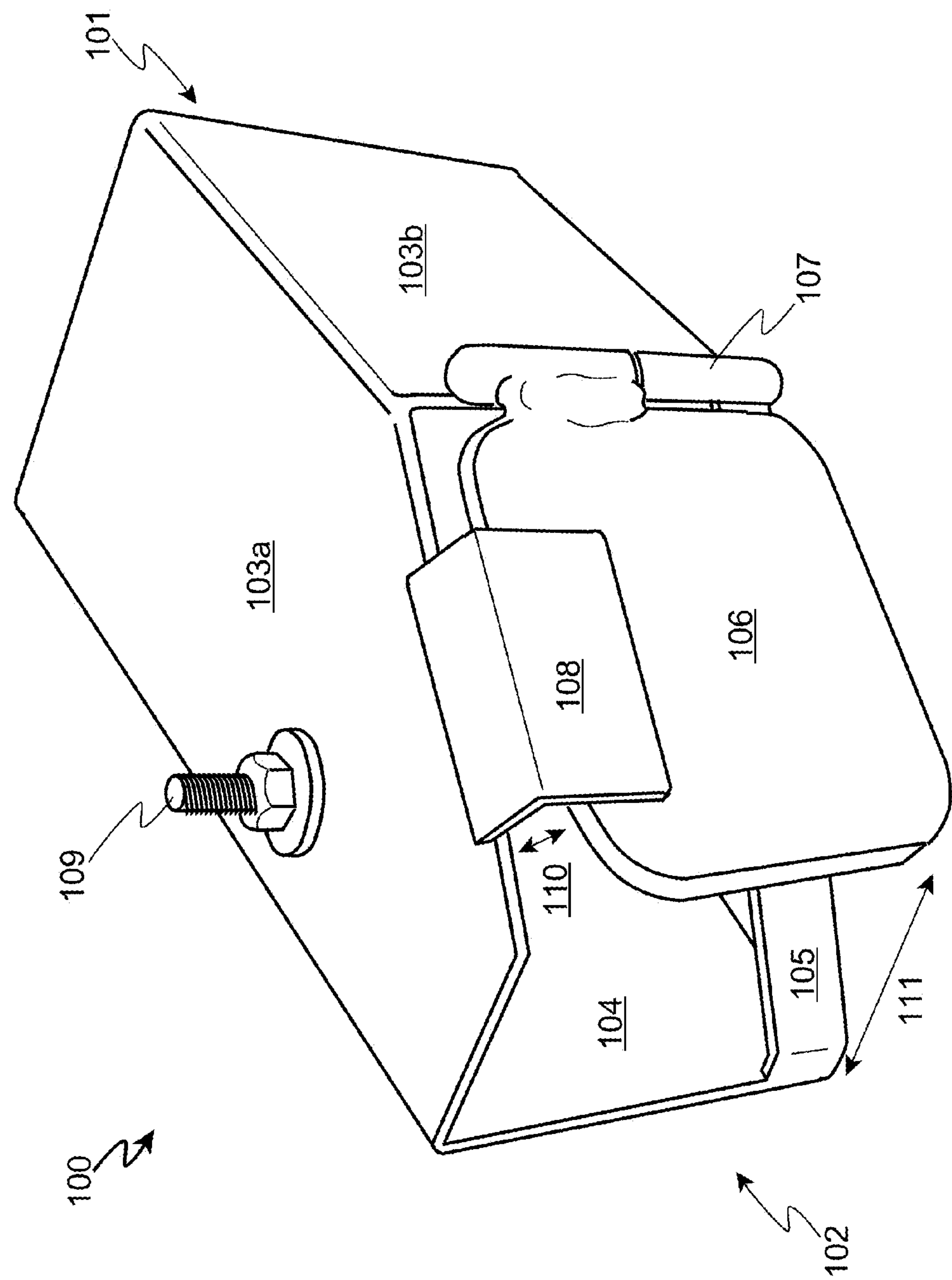
FIG. 1 illustrates in a perspective view an exemplary embodiment of the present invention with the muzzle-activated gate in an open (unrestricted) position.

Referring now to FIG. 1, an exemplary feeder chute (100) embodiment according to the present invention is shown. It has a receiver end (101) for receiving feed (pellets, corn, seeds, etc.) from a reservoir, and a dispenser end (102) for taking of the feed by an animal, this particular example being formed generally from stock metal tubing, such as 4" square tubing. Other embodiments may use other shapes, or may be formed from one or more pieces of flat stock material. In this view, a top (103*a*) and right side (103*b*) of the chute are visible, and an interior surface of a left side (104) is also visible. A bottom is not shown, but obviously present. The tested prototype was about 3.5" long on the left side (104) and about 6.5" long on the right side (103*b*). Throughout this disclosure, we will refer to right side and left side for the exemplary embodiments, but those skilled in the art will realize that the sides may be reversed without departing from the spirit and scope of the present invention.

Formed long a diagonal edge of the bottom of the dispenser end is a lip (105) which allows the feed to enter from a reservoir into the receiver end (101) and slide on the bottom until it reaches the lip (105) which acts as a detente, holding the feed there until taken by an animal of the desired kind. The tested prototype lip was about 0.5" tall.

The chute (100) is also provided with a gate (106) which is hinged to the side (103*b*) and forced to an open position by a return spring attached (109) to the top (103*a*) of the chute, with the gate (106) swinging open until it reaches a fully-open detente (108) as shown. The gate in the tested prototype was about 4"-5" long. Other forms of detente may be used in place of the angle-iron example in this embodiment. A spring-loaded hinge may be used in place of the separate return spring, however, some spring loaded hinges may include a certain amount of lubricant or grease which may warn off a deer. When the gate is in the full open position, a full open width (111) between the left side (104) and the dispenser-end edge of the gate (106) which is sufficient to receive a deer's nose and provide extra room for head rotation to allow the deer's tongue to retrieve the feed at the lip (105). However, this fully open space (111) is preferably less than the width of the nose of the cattle to be rejected by the chute. In some embodiments, the fully open detente gap (110) may be adjustable to accommodate the muzzles and tongues of the cattle to be rejected and allow access by various sizes of deer to be fed.

Figure 2:
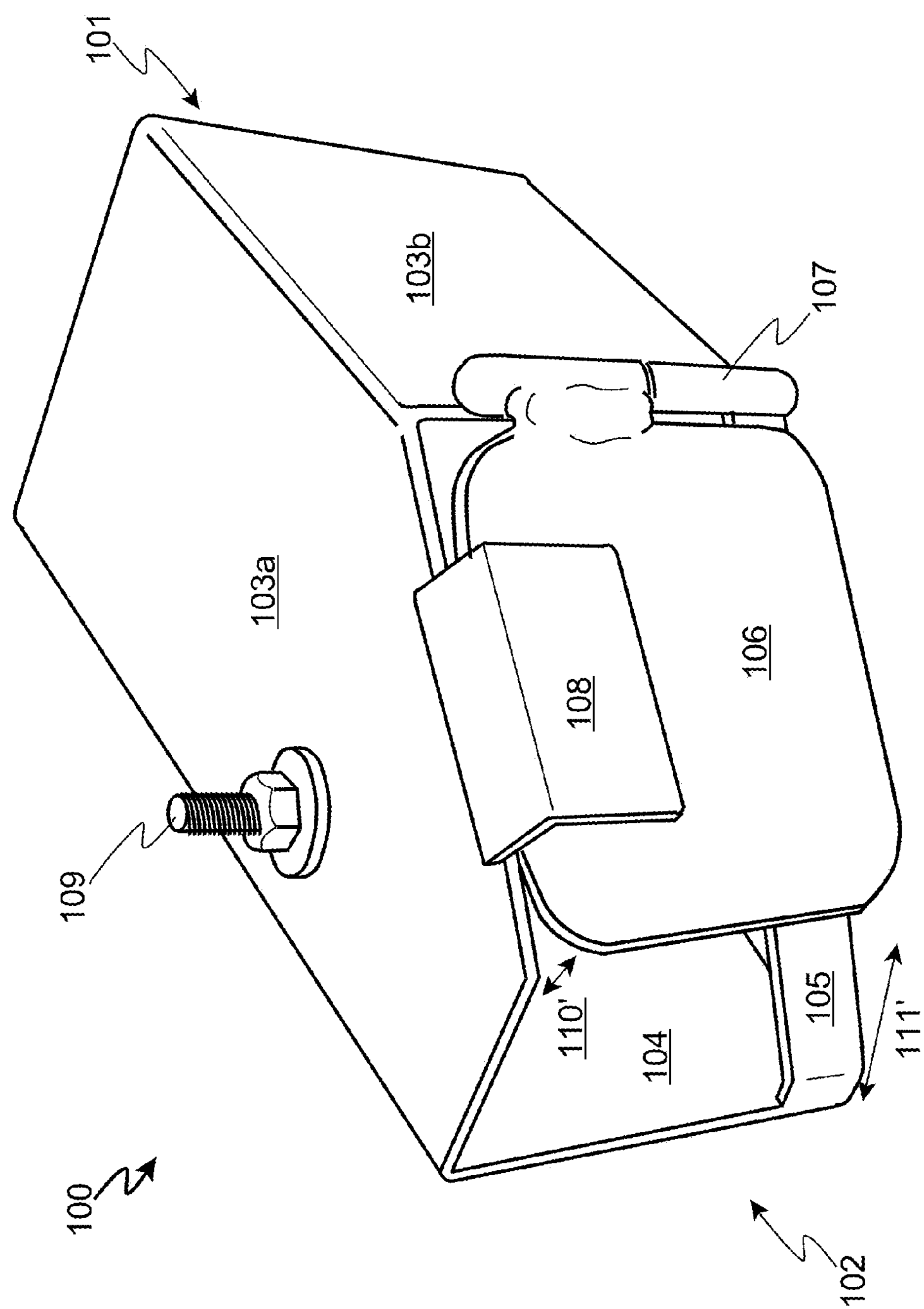
FIG. 2 illustrates in a perspective view an exemplary embodiment of the present invention with the muzzle-activated gate in an closed (restricted) position.

To prevent the cow from simply articulating its tongue into the chute to retrieve feed, the gate swings to a closed position as shown in FIG. 2 upon urging by the nose of the cow on the dispenser edge of the gate (106). In this fully closed position, the fully-closed space (111') between the dispenser-end edge of the gate (106) and the left side (104) of the chute is sufficiently small to prevent entry of a cows tongue, even when rolled, such as approximately 2" wide by 4" tall in the tested prototype. The gate, in this embodiment, swings to the closed position when it reaches, for example, the lip (105) or the diagonal edge of the top (103*a*), or both. Other fully-closed position detents may be possible, including adjustable fully-closed detents to allow the closed gap (110') to accommodate various sizes of deer to be fed and various sizes of cattle to be rejected.

Figure 3:
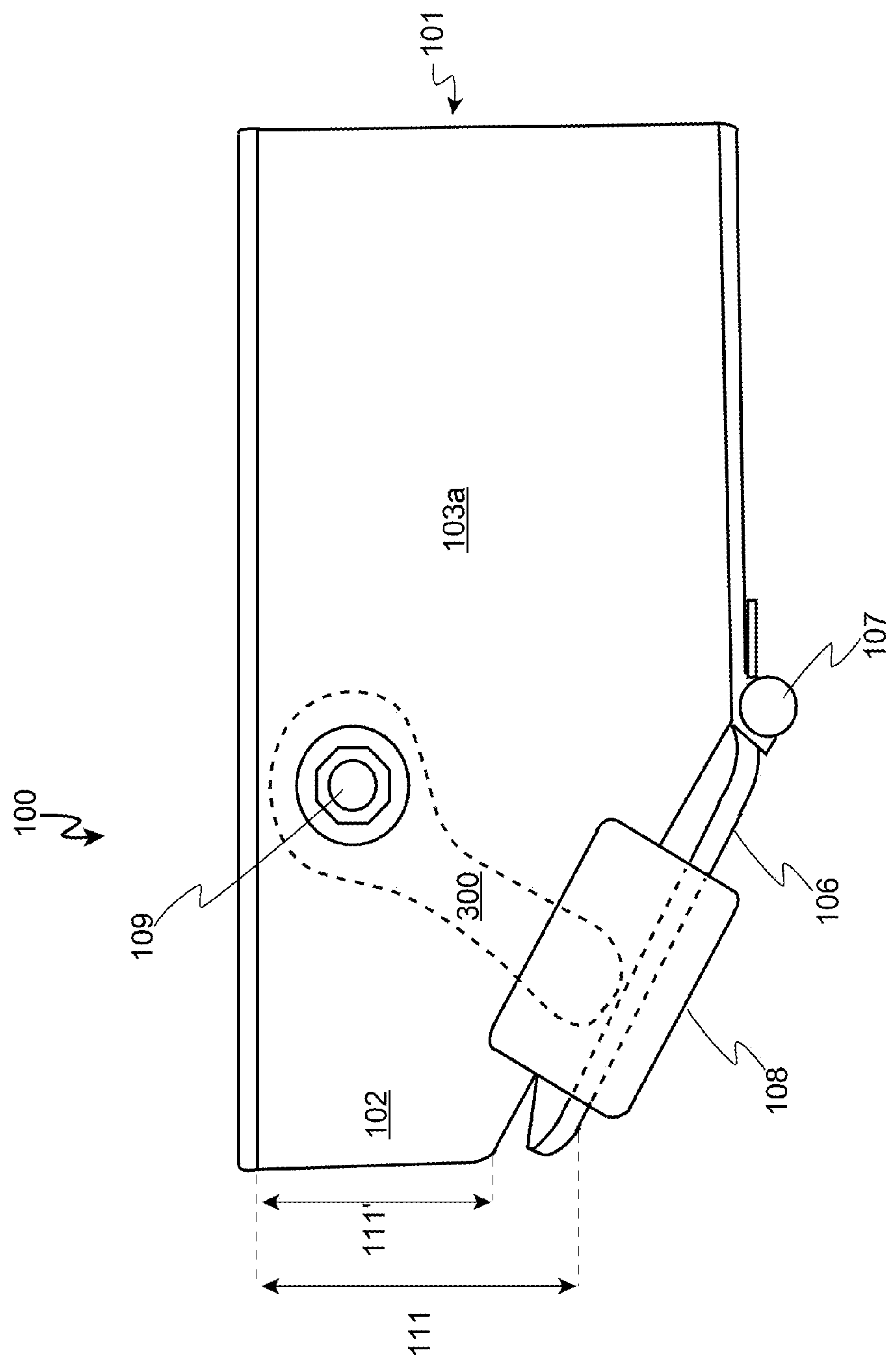
FIG. 3 illustrates in a top-down view an exemplary embodiment of correlation processes according to at least one embodiment of the present invention.

Turning now to FIG. 3, a top-down view of the exemplary embodiment of a chute (100) according to the present invention is shown. In this configuration, the fully-open width (111) is about 2.25", and the fully-closed width (111') is about 1".

According to usage experiments, an end section of a rubber tie-down strap (300) is retained by bolt (109) in the interior of the chute, position such that it naturally pushes against the interior surface of the gate (106) to press it towards the fully-open position as defined by the detente (108). Experiments have shown that this material and fastening means do not ward off deer, but other suitable spring means may be used as appropriate.

Figure 4:
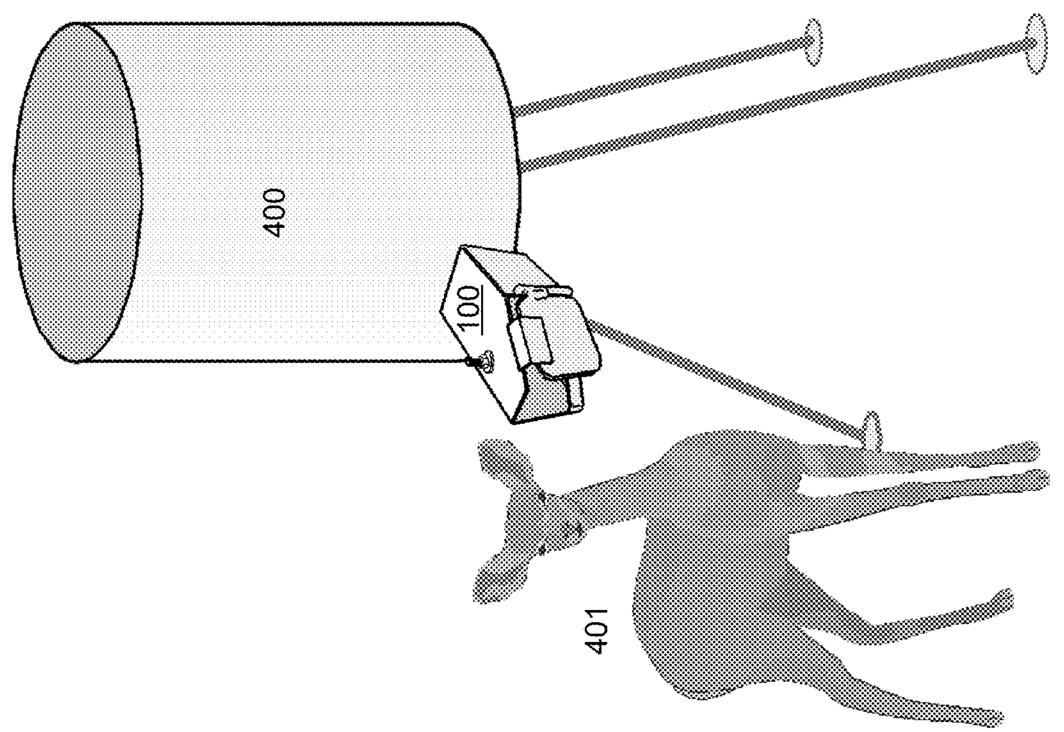
FIG. 4 provides a contextual depiction of a feeder chute according to the present invention configured to a feeder reservoir and stand for access by an animal such as a deer.

FIG. 4 shows the example embodiment chute (100) in the context of being configured with the receiver end communicating with the output of a feeder reservoir (400) such as an deer feeder having an auger or gravity-fed barrel, and with the dispensing end positioned in a manner suitable for taking of feed by a desired animal (401). The chute may be configured with a horizontal bottom essentially level such that the feed is advanced from the receiving end towards the dispensing end by pressure of feed from the reservoir (e.g., auger turns, etc.), or it may be configured with the bottom slightly angled downward towards the dispensing end to provide for gravity-driven advancement of the feed towards the dispensing end. More than one chute can be configured to each feeding reservoir, and the reservoirs may be other shapes than cylindrical, such as rectangular, square, etc.

CONCLUSION

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A chute for dispensing feed comprising:

a chute body having a receiver end, a dispenser end, and a passage formed between the receiving end and the dispensing end by a bottom wall, a first side wall and a second side wall;

a gate affixed to the first side wall by a hinge, wherein the first side wall is shorter in length than the second side wall such that a dispenser-end edge of the gate directly opposite of the hinge approximately aligns with an edge of the second side wall when the gate is in a fully-open position;

a bias mechanism to force the gate into the fully-open position; and a lip along the bottom wall at the dispenser end which stops the gate when urged against the bias mechanism towards a full-closed position;

wherein the dispenser end assumes a first width dimensions with the gate in the fully-opened position suitable for receiving a muzzle of a first kind of animal yet smaller than a muzzle of a second kind of animal, and wherein the dispenser end assumes a second width dimension with the gate urged towards the fully-closed position by the muzzle of the second kind of animal suitable to reject entry into the chute by a tongue of the second kind of animal.

2. The chute of claim 1 wherein the dispenser end dimensions assumed in the fully-opened position are approximately by 2.25 inches wide by 4 inches high.

3. The chute of claim 1 wherein the dispenser end dimensions assumed in the fully-closed position are approximately 1 inch wide by 4 inches high.

4. The chute of claim 1 wherein the bias mechanism comprises a portion of a rubber or synthetic rubber strap.

* * * * *